Aug. 7, 1956 G. A. LYON 2,757,973
WHEEL COVER
Filed Oct. 22, 1953
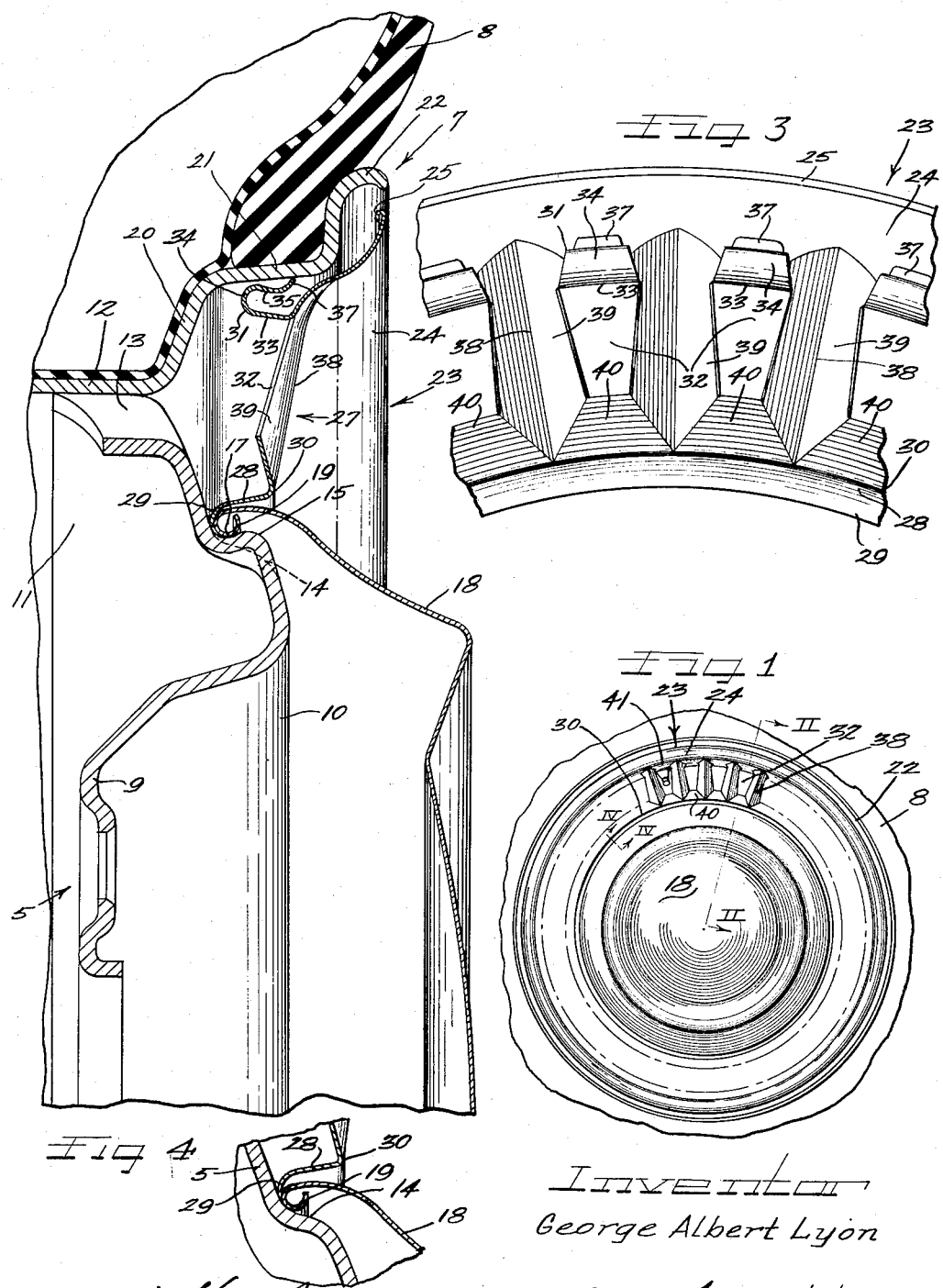
Inventor
George Albert Lyon

United States Patent Office 2,757,973
Patented Aug. 7, 1956

2,757,973

WHEEL COVER

George Albert Lyon, Detroit, Mich.

Application October 22, 1953, Serial No. 387,611

11 Claims. (Cl. 301—37)

The present invention relates to improvements in wheel structures and more particularly concerns the ornamental and protective covering of the outer sides of vehicle wheels.

An important object of the present invention is to provide a novel construction wherein a vehicle wheel is provided with a hub cap and trim ring assembly.

Another object of the invention is to provide a wheel structure wherein a trim ring and hub cap assembly are provided and in which the trim ring is self-retaining on the wheel so that even if the hub cap is not on the wheel, the trim ring will remain thereon, although when the hub cap is on the wheel, a novel cooperative relationship prevails between the edge of the hub cap and the trim ring.

A further object of the invention is to provide an improved trim ring construction for vehicle wheels.

Still another object of the invention is to provide a trim ring and hub cap cover assembly for the outer side of the vehicle wheel affording in service the appearance of a full cover over the outer side of the wheel.

Other objects, features and advantages of the present invention will be readily apparent from the following detailed description of a preferred embodiment thereof taken in conjunction with the accompanying drawings in which:

Figure 1 is a side elevational view of a vehicle wheel embodying the features of the invention;

Figure 2 is an enlarged radial sectional view taken substantially on the line II—II of Figure 1;

Figure 3 is a fragmentary rear elevational view of the trim ring of the present invention; and Figure 4 is a fragmentary sectional detail view taken substantially on the line IV—IV of Figure 1.

A vehicle wheel to which the present invention is particularly adaptable comprises a wheel body 5 supporting a tire rim 7 which in turn supports a pneumatic tire and tube assembly 8. Preferably the wheel body 5 is of the type covered in my Patent No. 2,445,330, issued July 20, 1948, comprising a disk spider body formed as by stamping operations from suitable heavy gauge sheet metal. A dished central bolt-on flange 9 on the wheel body is encircled by an annular intermediate axially outwardly extending nose bulge 10, while the outer margin of the body comprises a generally axially extending attachment flange 11 by which the body is attached in suitable manner as by riveting or welding to a base flange 12 of the tire rim. At suitable intervals such as 3 to 5, the attachment flange 11 is inset to provide air circulation wheel openings 13.

At the radially outer side of the nose bulge 10, the wheel body is provided with an axially outwardly facing annular shoulder 14 provided at suitable symmetrically spaced intervals such as 3 or 4, with radially outwardly projecting hub cap retaining bumps 15 each of which has an undercut-like retaining shoulder 17 appropriately spaced radially outwardly from the annular shoulder 14. Thereby a hub cap 18 provided with a resiliently flexible edge bead 19 is adapted to be retained in snap-on, pry-off relation on the wheel body by snapping of the bead 19 over the retaining bumps 15 and engagement of the bead within the under-cut or grooved shoulders 17 of the retaining bumps, with stretching of the beaded edge portion of the hub cap radially outwardly at the bumps and drawing radially inwardly of the beaded edge intermediate the bumps as will be apparent on comparison of Figures 2 and 4.

The tire rim 17 is of the multi-flange, drop center type including a side flange 20 extending generally radially outwardly from the outer side of the base flange 12 and merging with a generally axially outwardly and radially outwardly sloping or oblique intermediate flange 21 which merges with a generally radially outwardly and then axially outwardly turned terminal flange 22. Between the nose bulge 10 of the wheel body and the intermediate and terminal flanges 21 and 22 of the tire rim, therefore, is defined a substantial annular outwardly opening groove at the bottom of which are the wheel openings 13. To cover such groove ornamentally, and to afford a generally spoke-like appearance for the outer side of the wheel, as well as to enable unhampered air circulation through the wheel a novel trim ring 23 is provided for disposition over the outer side of the wheel in cooperation with the hub cap 18.

Herein the trim ring 23 comprises a sheet metal annulus made from suitable material such as stainless steel or brass sheet and burnished or plated and polished or painted, or a combination of finishes to afford the desired ornamental effect. At its outer margin, the trim ring extends into overlying relation to the terminal flange 22 and is provided with an annular rib-like outwardly convex portion 24 with its outer edge turned under to provide a reinforcing and finishing bead-like flange 25 which in assembly with the wheel is preferably disposed in slightly spaced relation to the adjacent tip of the terminal flange 22 of the tire rim. The outer annular portion 24 of the trim ring preferably slants generally radially and axially inwardly to an intermediate portion 27 which joins the same more or less angularly and slopes radially and axially inwardly at a less slanting angle.

An inner marginal annular flange 28 extends angularly generally axially inwardly and slants slightly obliquely radially inwardly from the inner margin of the intermediate portion 27 of the trim ring and is generally of an inner diameter somewhat less than the outside diameter of the hub cap 18 but has a generally radially inwardly turned terminal edge portion 29 which is adapted to engage against the wheel body and underlie the edge bead 19 of the hub cap. For this purpose it will be observed, particularly in Figure 2, that the edge of the terminal flange portion 29 is of a diameter slightly less than the base portion of the shoulders 17 of the retaining bumps, but nevertheless of large enough diameter to be disposed close enough to the shoulder 14 of the wheel body to underlie the radially outer portion of the bead 19 in the areas between the bumps 15, as depicted in Fig. 4. While adjacent the bumps 15, where the bead 19 is stretched radially outwardly, only a small gap will be present between the margin of the hub cap 18 and the flange 28 of the trim ring, in the areas between bumps where the hub cap edge bead 19 is deflected generally radially inwardly, a substantial gap will be present between the trim ring inner marginal flange 28 and the adjacent margin of the hub cap. Thereby a pry-off tool such as a screwdriver can be conveniently inserted between the hub cap margin and the inner margin of the trim ring, especially in the between-bump areas of the assembly for prying the hub cap free from the wheel, and more especially the retaining bumps 15. In this connection a rigid pry-off shoulder 30 at juncture of the intermediate trim ring portion 27 and the flange 28 affords a pry-off fulcrum for the pry-off tool.

In order to provide for self-retention of the trim ring 23 upon the wheel, so that the trim ring will stay on the wheel even though the hub cap 18 may have been pried off of the wheel or may for some reason not have been applied to the wheel, means are provided on the trim ring for self-retaining engagement with a flange of the wheel. To this end, a uniform series of retaining fingers 31 is provided on the trim ring, herein comprising integral portions of the trim ring struck from a respective series of apertures 32 in the intermediate portion 27. Each of the retaining fingers 31 comprises a generally axially inwardly extending body or leg portion 33 disposed at the radially outer ends of the apertures 32. A small radius loop 34 joins the body legs 33 of the clips to respective generally axially and radially outwardly directed retaining legs 35 terminating in generally radially outwardly turned short and stiff retaining tips 37. The retaining tips 37 are normally disposed to extend to a diameter slightly greater than the inside diameter of the intermediate flange 21 of the tire rim and are arranged to enter into retaining tensioned edgewise engagement with the intermediate flange for retaining the trim ring in place on the wheel. It will be observed that the retaining legs 35 are disposed in closely spaced relation to the intermediate flange in the final assembly. Accordingly, although the retaining tips 37 of the fingers effect a strong retaining engagement with the intermediate flange, it is possible to pry the trim ring from the wheel by inserting a pry-off tool such as a screwdriver or the like behind the reinforcing edge flange 25 of the trim ring and applying leverage generally axially outwardly on the trim ring so that the retaining tips 37 are forced to slide axially outwardly along the intermediate flange 21 until the trim ring has been released from the wheel.

Substantial resilience is afforded in the retaining fingers 31 by having the same of substantial width, with the greatest stiffness in the legs 33, while the retaining legs 35 are of less stiffness so as to facilitate flexing of the fingers while applying the trim ring to the wheel and in removing the same from the wheel. Therefore, the legs 33 are of tapering shape with the widest dimension at juncture with the body of the trim ring. This is accomplished herein by cutting the apertures 32 of gradually flaring dimension from their inner ends toward a largest or widest dimension at their outer ends as shown in Fig. 3. It will thus be observed that the widest dimension of the retaining fingers is at juncture of the body finger portions 33 with the trim ring while the narrowest dimension is at the retaining tips 37.

Since the apertures 32 tend to weaken the trim ring and thus make the same rather flimsy, means are provided to reinforce the apertured intermediate portion 27 of the trim ring. To this end, the spoke-like areas intermediate the apertures 32 connecting the radially outer portion 24 of the cover with the radially inner portion of the trim ring are formed into rib-like shape preferably having radially extending ridges 38 and respective oppositely sloping side flanges 39. At their radially outer ends the ribs merge into the radially inner side of the outer annular portion 24 spaced radially outwardly from the outer ends of the apertures 32 and thus form the juncture of the retaining clip or finger legs 33 with the body of the trim ring. This substantially stiffens the juncture areas of the trim ring adjacent the retaining fingers 31.

At the radially inner ends of the connecting ribs, the ridges 38 merge into the pry-off shoulder rib or ridge 30. Reinforcing inner flange panels 40 sloping generally radially outwardly and axially inwardly from the annular pry-off rib 30 connect the inner ends of the spoke side panels 93 into a fairly rigid unit.

In applying the cover assembly to the wheel, the trim ring 23 is first assembled by generally centering the same relative to the tire rim 7 with the retaining terminal flanges 37 of the retaining fingers disposed at the axially outer side of the intermediate flange 21 of the tire rim and with the retaining terminals of the retaining fingers disposed at the radially outer side of the intermediate flange 21 and with a valve stem 41 projecting through one of the apertures 32 as seen in Fig. 1. Then the trim ring is pressed axially inwardly to effect axial inward sliding movement of the terminal flanges 37 of the retaining fingers into effective tensioned retaining engagement with the intermediate flange 21. The axially inward pressing of the trim ring is limited by engagement of the inner marginal terminal flange 29 thereof with the wheel body. This maintains the outer marginal portion 24 of the trim ring in spaced relation to the tire rim. Furthermore, the wheel openings 32 are thus disposed in overlying relation to the juncture portion between the tire rim and the wheel body with the openings 13 generally aligned therebehind so that air circulation is enabled through the trim ring openings 32 and the wheel openings 13. The trim ring 23 is now retained on the wheel effectively against displacement except by application of a pry-off tool behind the outer margin thereof.

After the trim ring has been mounted on the wheel, the hub cap 18 is snapped into position by pressing the bead 19 over the retaining bumps 15. Thereby the bead 19 bears against the turned inner marginal flange 29 of the trim ring and locks the same in place. Removal of the hub cap is, of course, facilitated by provision of the pry-off rib 30 on the inner marginal portion of the trim ring adjacent to but spaced axially and radially outwardly from the marginal bead 19 of the hub cap in assembly on the wheel so that a pry-off tool can be conveniently applied to and efficient short leverage applied to the margin of the hub cap to remove the same from the wheel. The trim ring 23, however, remains on the wheel until it is positively pried therefrom as heretofore described.

It will be understood that modifications and variations may be effected without departing from the scope of the novel concepts of the present invention.

I claim as my invention:

1. In a wheel structure including a tire rim and a wheel body with wheel openings enabling circulation of air through the wheel adjacent the tire rim, a trim ring for overlying the tire rim and the adjacent portion of the wheel body, said trim ring having substantially rigid annular inner and outer marginal portions and an intermediate portion provided with an annular series of generally radially extending substantially elongated apertures having retaining fingers struck out therefrom behind the trim ring and engageable with a flange of the tire rim spaced substantially radially outwardly from the wheel openings, said apertures generally overlying the wheel openings in the tire rim, the annular inner marginal portion of the trim ring being engageable with the wheel body to maintain the outer annular portion of the trim ring in spaced relation to the tire rim, the areas of the intermediate portion of the trim ring between the apertures comprising spoke-like rigid ribs rigidly connecting the inner and outer annular rigid portions of the trim ring.

2. In a wheel structure including a tire rim and a disk spider body supporting the tire rim and having a generally radially outwardly extending annular shoulder spaced from the tire rim and provided with a series of radially outwardly projecting hub cap retaining bumps, a trim ring for disposition over the tire rim and the wheel body radially outwardly from said bumps, said trim ring having a generally axially extending inner marginal flange provided with a generally radially inturned inner flange terminal portion engageable with the wheel body, a hub cap having a flexible beaded margin engageable in snap-on, pry-off relation with said bumps and clampingly engaging said turned inner marginal flange of the trim ring, said trim ring having a series of apertures therein with intermediate rib-like reinforcing spoke portions, said spoke portions merging with an annular pry-off rib at the outer side of said generally axially extending inner flange of the trim ring.

3. In a wheel structure including a tire rim and a disk spider body supporting the tire rim and having a generally radially outwardly extending annular shoulder spaced from the tire rim and provided with a series of radially outwardly projecting hub cap retaining bumps, a trim ring for disposition over the tire rim and the wheel body radially outwardly from said bumps, said trim ring having a generally axially extending inner marginal flange provided with a generally radially inturned inner flange terminal portion engageable with the wheel body, a hub cap having a flexible beaded margin engageable in snap-on, pry-off relation with said bumps and clampingly engaging said turned inner marginal flange of the trim ring, said trim ring having a series of apertures therein with intermediate rib-like reinforcing spoke portions, said spoke portions merging with an annular pry-off rib at the outer side of said generally axially extending inner flange of the trim ring, said spoke portions being laterally joined at their inner end portions by oblique panel flange portions merging with said pry-off rib.

4. In a wheel structure including a tire rim having an intermediate flange and a wheel body supporting the tire rim and having wheel openings adjacent the tire rim, a trim ring for disposition opposite the tire rim and the adjacent portion of the wheel body comprising an outer annular portion for generally overlying the outer part of the tire rim and an inner annular portion for overlying the wheel body and with an intermediate portion overlying the juncture of the tire rim and the wheel body in substantially spaced relation, an inner terminal flange on the inner annular portion of the trim ring engageable with the wheel body to retain the trim ring in spaced relation to the tire rim, said intermediate portion having a series of apertures therein with retaining spring fingers struck therefrom and formed into generally U-shaped loops behind the outer annular portion of the trim ring and having short and stiff terminal flanges retainingly engageable in press-on, pry-off relation with said intermediate flange, said apertures being located to be opposite the wheel openings in the wheel body to enable air circulation through the wheel and the trim ring, and a hub cap for disposition opposite the wheel body and having its margin adjacent to the inner marginal portion of the trim ring.

5. In a trim ring for disposition at the outer side of a vehicle wheel, an annular trim ring body having an outer annular transversely angularly shaped substantially rigid rib-like portion, an inner annular substantially rigid portion and an intermediate portion, said intermediate portion having a series of generally radially extending apertures therein, with retaining fingers provided by material struck from said apertures, said retaining fingers being disposed behind the trim ring, and the material intermediate the apertures comprising generally radially extending transversely angularly shaped substantially rigid rib-like spokes, the outer end portions of the spokes merging with the radially outer annular rib-like portion of the trim ring radially outwardly beyond the outer ends of the apertures and extending beyond the radially inner extremity of said outer annular portion.

6. In a wheel structure including a tire rim and a wheel body with wheel openings enabling circulation of air through the wheel adjacent the tire rim and wherein the tire rim has a generally radially inwardly facing annular intermediate flange spaced substantially radially outwardly from the wheel openings and merging with a terminal flange, a trim ring for overlying the tire rim inclusive of said terminal and intermediate flanges and extending generally radially inwardly to overlie the wheel body to a substantial extent radially inwardly beyond the wheel openings, the trim ring having radially inner and outer continuous annular substantially rigid portions and an intermediate portion subdivided into a series of elongated generally radially extending rib-like spokes connecting said annular trim ring portions and providing therebetween alternating radially elongated openings arranged to be generally opposite the wheel openings for air circulation therethrough and the wheel openings, material struck from the openings at the radially outer ends thereof being formed axially inwardly of the cover into cover-retaining fingers retainingly engageable in press-on, pry-off relation with the intermediate flange of the tire rim.

7. In a wheel structure including a tire rim and a wheel body with wheel openings enabling circulation of air through the wheel adjacent the tire rim and wherein the tire rim has a generally radially inwardly facing annular intermediate flange spaced substantially radially outwardly from the wheel openings and merging with a terminal flange, a trim ring for overlying the tire rim inclusive of said terminal and intermediate flanges and extending generally radially inwardly to overlie the wheel body to a substantial extent radially inwardly beyond the wheel openings, the trim ring having radially inner and outer continuous annular substantially rigid portions and an intermediate portion subdivided into a series of elongated generally radially extending rib-like spokes connecting said annular trim ring portions and providing therebetween alternating radially elongated openings arranged to be generally opposite the wheel openings for air circulation therethrough and the wheel openings, material struck from the openings at the radially outer ends thereof being formed axially inwardly of the cover into cover-retaining fingers retainingly engageable in press-on, pry-off relation with the intermediate flange of the tire rim, said rib-like spokes being of rigid transversely angular shape and having the radially outer ends thereof extending substantially radially outwardly beyond said openings and said fingers and merging for mutual rigidity tapering into the radially outer rigid portion of the trim ring.

8. In a trim ring for disposition at the outer side of a vehicle wheel, a sheet metal trim ring body having an outer annular substantially rigid portion, an inner annular substantially rigid portion and an intermediate portion, said intermediate portion having a series of generally radially extending apertures therein, with retaining fingers provided by material struck from said apertures, said retaining fingers being disposed behind the trim ring body, and the material intermediate the apertures comprising generally radially extending and transversely angularly shaped substantially rigid rib-like spokes with the end portions thereof adjacent the fingers merging a substantial distance beyond the fingers rigidly into the rigid annular portion of the trim ring nearest the fingers.

9. In a trim ring for disposition at the outer side of a vehicle wheel, an annular trim ring body having an outer annular substantially rigid portion, an inner annular substantially rigid portion and an intermediate portion, said intermediate portion having a series of generally radially extending apertures therein, with retaining fingers provided by material struck from said apertures, said retaining fingers being disposed behind the trim ring, and the material intermediate the apertures comprising generally radially extending rib-like spokes, the radially inner portion of the trim ring comprising an annular pry-off rib and said spokes merging at their inner ends with said pry-off rib, the outer end portions of the spokes merging with the radially outer annular portion of the trim ring radially outwardly beyond the outer ends of the apertures and extending beyond the radially inner extremity of said outer annular portion, whereby said annular portions are substantially rigidly interconnected by the spokes.

10. In a wheel structure including a tire rim and a wheel body with wheel openings enabling circulation of air through the wheel adjacent the tire rim and wherein the tire rim has a generally radially inwardly facing annular intermediate flange spaced substantially radially outwardly from the wheel openings and merging with a terminal flange, a trim ring member for overlying the tire rim inclusive of said terminal and intermediate flanges and extending generally radially inwardly to overlie the wheel body to a substantial extent radially inwardly beyond the wheel openings, the trim ring member having radially inner and outer continuous substantially circular and rigid portions and an intermediate portion subdivided into a series of elongated generally radially extending rib-like spokes connecting said annular trim ring member portions and providing therebetween alternating radially elongated openings arranged to be generally opposite the wheel openings for air circulation therethrough and the wheel openings, material struck from the openings at the radially outer ends thereof being formed axially inwardly of the cover into cover-retaining fingers retainingly engageable in press-on, pry-off relation with the intermediate flange of the tire rim.

11. In a trim ring for disposition at the outer side of a vehicle wheel, an annular trim ring body having an outer annular transversely angularly shaped substantially rigid rib-like portion, a cover portion immediately radially inwardly adjacent to said outer annular portion having a series of generally radially extending apertures therein, with retaining fingers provided on and behind said outer annular portion by material struck from said apertures, and the material intermediate the apertures comprising generally radially extending transversely angularly shaped substantially rigid rib-like spokes, the outer end portions of the spokes merging with the radially outer annular rib-like portion of the trim ring radially outwardly beyond the outer ends of the apertures and extending beyond the radially inner extremity of said outer annular portion.

References Cited in the file of this patent

UNITED STATES PATENTS

| | | |
|---|---|---|
| D. 167,271 | McLeod | July 15, 1952 |
| 2,198,056 | Lyon | Apr. 23, 1940 |
| 2,231,931 | Lyon | Feb. 18, 1941 |
| 2,368,237 | Lyon | Jan. 30, 1945 |
| 2,368,238 | Lyon | Jan. 30, 1945 |
| 2,445,330 | Lyon | July 20, 1948 |